(12) United States Patent
Bolotin et al.

(10) Patent No.: US 11,880,261 B2
(45) Date of Patent: Jan. 23, 2024

(54) AUTOMATIC METHOD FOR POWER MANAGEMENT TUNING IN COMPUTING SYSTEMS

(71) Applicant: Nvidia Corporation, Santa Clara, CA (US)

(72) Inventors: Evgeny Bolotin, Kenmore, WA (US); Yaosheng Fu, Santa Clara, CA (US); Zi Yan, Somerville, MA (US); Gal Dalal, Haifa (IL); Shie Mannor, Haifa (IL); David Nellans, Round Rock, TX (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/709,720

(22) Filed: Mar. 31, 2022

(65) Prior Publication Data

US 2023/0079978 A1    Mar. 16, 2023

Related U.S. Application Data (60) Provisional application No. 63/244,854, filed on Sep. 16, 2021.

(51) Int. Cl.
| | |
|---|---|
| *G06F 1/324* | (2019.01) |
| *G06F 11/34* | (2006.01) |
| *G06F 1/20* | (2006.01) |

(52) U.S. Cl.
CPC .............. *G06F 1/324* (2013.01); *G06F 1/206* (2013.01); *G06F 11/3495* (2013.01)

(58) Field of Classification Search
CPC ....................................................... G06F 1/324
See application file for complete search history.

(56) References Cited

U.S. PATENT DOCUMENTS

| | | | |
|---|---|---|---|
| 10,255,100 B2 * | 4/2019 | Frazier ................ | G06F 11/3433 |
| 11,320,883 B2 * | 5/2022 | Baskaran ................ | G06F 1/206 |

(Continued)

OTHER PUBLICATIONS

Choi, et al.; "Fine-Grained Dynamic Voltage and Frequency Scaling for Precise Energy and Performance Trade-off based on the Ratio of Off-chip Access to On-chip Computation Times"; IEEE Trans. Comput. Aided Des. Integr. Circuits Syst 24; 2004; 6 pgs.

(Continued)

*Primary Examiner* — Suresh Suryawanshi (57) ABSTRACT

A system, method, and apparatus of power management for computing systems are included herein that optimize individual frequencies of components of the computing systems using machine learning. The computing systems can be tightly integrated systems that consider an overall operating budget that is shared between the components of the computing system while adjusting the frequencies of the individual components. An example of an automated method of power management includes: (1) learning, using a power management (PM) agent, frequency settings for different components of a computing system during execution of a repetitive application, and (2) adjusting the frequency settings of the different components using the PM agent, wherein the adjusting is based on the repetitive application and one or more limitations corresponding to a shared operating budget for the computing system.

28 Claims, 9 Drawing Sheets

(56) References Cited

U.S. PATENT DOCUMENTS

| | | | | |
|---|---|---|---|---|
| 2005/0246561 A1* | 11/2005 | Wu | ........................ | G06F 1/3287 |
| | | | | 713/300 |
| 2014/0089699 A1* | 3/2014 | O'Connor | .............. | G09G 5/363 |
| | | | | 713/300 |
| 2014/0359269 A1* | 12/2014 | Moen | ....................... | G06F 9/445 |
| | | | | 713/2 |
| 2017/0212575 A1* | 7/2017 | Wang | ....................... | G06F 1/206 |
| 2019/0286215 A1* | 9/2019 | Paul | .......................... | F24F 11/62 |
| 2022/0113785 A1* | 4/2022 | Lu | ............................ | G06N 7/01 |
| 2022/0206558 A1* | 6/2022 | Åhlman | ................. | G06F 1/3234 |
| 2022/0206850 A1* | 6/2022 | Paul | ......................... | G06F 9/505 |
| 2022/0229484 A1* | 7/2022 | Vellingiri | .............. | G06F 1/3287 |
| 2023/0079229 A1* | 3/2023 | Lovell | .................... | G06N 3/065 |
| | | | | 706/15 |

OTHER PUBLICATIONS

Evans, et al.; "DeepMind AI Reduces Google Data Centre Cooling Bill by 40%"; Applied; Jul. 20, 2016; 5 pgs. https://deepmind.com/blog/article/deepmind-ai-reduces-google-data-centre-cooling-bill-40.

Chen, et al.; "Profit: priority and power/performance optimization for many-core systems"; IEEE Transactions on Computer-Aided Design of Integrated Circuits and Systems; IEEE Xplore Digital Library; Aug. 30, 2016; 13 pgs.

Shen, et al.; "Achieving Autonomous Power Management Using Reinforcement Learning"; Transactions on Design Automation of Electronic Systems; vol. 18, No. 2, Article 24; Mar. 2013; 32 pgs. https://acm.org/doi/10.1145/2442087.2442095.

Wu, et al.; "GPGPU Performance and Power Estimation Using Machine Learning"; HPCA; 2015; 13 pgs. https://ieeexplore.ieee.org/document/7056063.

Majumdar, et al.; "Dynamic GPGPU Power Management Using Adaptive Model Predictive Control"; HPCA; 2017; 12 pgs. https://www.csl.cornell.edu/~albonesi/research/papers/hpca17.pdf.

Dutta, et al.; "GPU Power Prediction via Ensemble Machine Learning for DVFS Space Exploration"; CF; Ischia, Italy; 2018; 8 pgs. https://vtechworks.lib.vt.edu/bitstream/handle/10919/81997/ef-gpu-power-4.pdf?sequence=1&isAllowed=y.

Dongara, et al.; "AMD "Richland" Client APU"; Hot Chips 25; Aug. 2013; 27 pgs.

"Intel Turbo Boost Technology 2.0: Higher Performance When You Need it Most"; 3 pgs https://www.intel.com/content/www/us/en/architecture-and-technology/turbo-boost/turbo-boost-technology.html.

Burnes; "Ampere-NVIDIA's 2nd gen RTX architecture—Coming To Laptops"; Gforce News; Jan. 12, 2021; 14 pgs. https://www.nvidia.com/en-us/geforce/news/rtx-30-series-laptops/.

Majumdar, et al.; "Dynamic GPGPU Power Management Using Adaptive Model Predictive Control"; IEEE International Symposium on High Performance Computer Architecture; HPCA 2017; 12 pgs.

Isci, et al.; "An Analysis of Efficient Multi-Core Global Power Management Policies: Maximizing Performance for a Given Power Budget"; The 39th Annual IEEE/ACM International Symposium on Microarchitecture (MICRO'06); 2006; 12 pgs.

Li, et al.; "Dynamic Power-Performance Adaptation of Parallel Computation on Chip Multiprocessors"; HPCA; Austin, TX; 2006; 11 pgs.

Cochran, et al.; "Pack & Cap: Adaptive AVFS and Thread Packing Under Power Caps"; MICRO'11, Porto Alegre, Brazil; Dec. 3-7, 2011; 11 pgs.

Herbert, et al.; "Analysis of Dynamic Voltage/Frequency Scaling in Chip-Multiprocessors"; ISLPED'07, Portland, Oregon; Aug. 27-29, 2007; 6 pgs.

Winter, et al.; "Scalable Thread Scheduling and Global Power Management for Heterogeneous Many-Core Architectures"; PACT'10, Vienna, Austria; Sep. 11-15, 2010; 11 pgs.

Sartori, et al.; "Distributed Peak Power Management for Many-core Architectures"; Proc. Date, Nice, France; 2009; 4 pgs.

Cebrián, et al.; "Power Token Balancing: Adapting CMPs to Power Constraints for Parallel Multithreaded Workloads"; IEEE International Parallel & Distributed Processing Symposium, Anchorage, AK; 2011; 12 pgs.

Liu, et al.; "Enhanced Q-Learning Algorithm for Dynamic Power Management with Performance Constraint"; Proc. Data, Dresden, Germany; 2010; 4 pgs.

Tan, et al.; "Adaptive Power Management Using Reinforcement Learning"; ICCAD'09, San Jose, California; Nov. 2-5, 2009; 7 pgs.

Juan, et al.; "Power-aware Performance Increase via Core/Uncore Reinforcement Control for Chip-Multiprocessors"; ISLPED'12, Redondo Beach, CA; Jul. 30-Aug. 1, 2012; 6 pgs.

Pan, et al.; "Scalable Power Management Using Multilevel Reinforcement Learning for Multiprocessors"; ACM Transactions on Design Automation of Electronic Systems, vol. 19, No. 4, Article 33; Aug. 2014; 23 pgs.

Russel; "MLPerf Issues New Inferencing Results, Adds Power Metrics, Nvidia Wins (Again)"; HPCwine; Apr. 21, 2021; 19 pgs. https://www.hpcwire.com/2021/04/21/mlperf-issues-newinferencing-sults-adds-power-metrics-nvidia-wins-again/.

Patterson, et al.; "Carbon Emissions and Large Neural Network Training"; 2021; 22 pgs.

* cited by examiner

AUTOMATIC METHOD FOR POWER MANAGEMENT TUNING IN COMPUTING SYSTEMS

CROSS-REFERENCE TO RELATED APPLICATION

This application claims the benefit of U.S. Provisional Application Ser. No. 63/244,854, filed by Evgeny Bolotin, et al. on Sep. 16, 2021, entitled "AUTOPM: AN AUTOMATIC METHOD FOR POWER MANAGEMENT TUNING IN DEEP LEARNING COMPUTING SYSTEMS," commonly assigned with this application and incorporated herein by reference in its entirety.

TECHNICAL FIELD

This application is directed, in general, to managing power for a computing system and, more specifically, to automated system level power management for a computing system.

BACKGROUND

Computing platforms, or systems, are increasingly judged not just by their performance at a specific power envelope, but by overall energy efficiency or energy per task. The overall carbon footprint of these systems for processing workloads is becoming increasingly important. As such, power delivery and thermal conditions associated with processing workloads are scrutinized.

The thermal conditions in computing systems fluctuate over relatively long periods (seconds or even minutes) and the thermal state at any given moment is dictated by the underlying workload(s). As a result, the sequence of power management choices taken over many relatively short power management phases (each typically controlled at the granularity of milliseconds) contributes to the long term thermal and power conditions of the system. Making the proper power management choices for the various phases, however, can be a complex process that involves continuous system-level decision-making. Because of the inherent problem complexity, current processor power management mechanisms for compute applications often leverage relatively simple heuristics to boost the clock frequency when hardware utilization is high and decrease the clock frequency when hardware utilization is low.

SUMMARY

In one aspect, an automated method of power management for a computing system is disclosed. In one example, the automated method includes: (1) learning, using a power management (PM) agent, frequency settings for different components of a computing system during execution of a repetitive application, and (2) adjusting the frequency settings of the different components using the PM agent, wherein the adjusting is based on the repetitive application and one or more limitations corresponding to a shared operating budget for the computing system.

In another aspect, a power-management (PM) agent for a computing system is disclosed. In one example, the PM agent includes: (1) a memory that receives frequencies for individual components of a computing system corresponding to computational phases of a repetitive application, and (2) one or more processing units that perform operations including determining adjustments to the frequencies based on one or more limitations corresponding to a shared operating budget for the computing system.

In yet another aspect, a method of training a PM agent for a computing system is disclosed. In one example, the method of training includes: (1) receiving frequency settings for different components of a computing system that correspond to computational phases of a repetitive application executing on the computing system, (2) learning frequency settings for the computational phases based on one or more limitations corresponding to thermal shared operating budget for the computing system, and (3) saving the frequency settings as optimal settings for the different components during the computational phases.

BRIEF DESCRIPTION

Reference is now made to the following descriptions taken in conjunction with the accompanying drawings that illustrate examples of an apparatus, system, or method constructed or carried out according to the principles of the disclosure, in which.

DETAILED DESCRIPTION

Existing PM techniques for compute workloads are largely agnostic of the workload (also referred to herein as application) specifics and adjust performance and power by monitoring the hardware telemetry in conjunction with running a combination of hand-tuned, device-specific algorithms on embedded PM hardware controllers. Typically, each of the system hardware components are considered as operating in isolation in existing PM techniques. The various components of a computing system can include, for example, a central processing unit (CPU), a graphics processing unit (GPU), a data processing unit (DPU), memory, and input/output interfaces. Due to a lack of automatic and global system-level optimization and coordination among the components of a computing system, current techniques fall short of achieving optimal system-level performance and energy-efficiency.

The disclosure provides a system and method of PM for a computing system that optimizes individual frequencies of components of the computing system using ML. Thus, the disclosed PM optimizes the overall power performance of a computing system by optimizing the operation of the system's components using ML. The computing system can be a tightly integrated system that considers an overall operating budget for the computing system that is shared between the components of the computing system while adjusting the frequencies of the individual components of the computing system. A shared operating budget for a computing system includes, for example, a shared power budget, a shared thermal budget, or both a shared power and thermal budget. The disclosed ML system and method can choose a set of frequencies per system component over time to maximize the overall cumulative desired utility, which we refer to as reward, summed over multiple time-steps (for example total performance improvement and/or energy savings per workload) for the computing system. The ML system and method can provide continuous system-level decision making for PM that entails tracking the current and past system conditions and prior PM decisions, workload performance, as well as extrapolating these to future computational phases. The continuous system-level decision making can entail orchestrating dynamic frequency and voltage control of each of the system components while maximizing performance, reducing energy, or achieving a combination thereof.

The ML system and method can choose a set of frequencies for the components of the computing system that correspond to repetitive applications. A repetitive application has a repetitive nature wherein a same piece of code (or a similar sequence of instructions, which leads to a similar hardware behavior) is executed repetitively for many iterations, such as from hundreds to many millions iterations depending on application and dataset. Repetitive applications can be highly optimized when compared to general purpose applications with less predictable computational phases.

ML training and inferencing (without limiting the generality) are good examples of repetitive applications. For example, DL workloads have a repetitive nature and are typically executing the same piece of code for many iterations during both training and inferencing. The repetitive characteristic provides an opportunity for specific PM tuning that can be performed offline, online, or a combination of both offline and online. For example, the disclosed ML PM process can be used for power management optimization of per-component (e.g., CPU, GPU, DRAM, Network and I/O interfaces) frequencies for tightly integrated DL computing systems with shared operating budget limitations. The DL computing systems can be used in data centers. As such, the ML PM process can be used to reduce the overall power requirements of a data center, reduce the thermal load, and thus reduce cooling requirements for the data center. RL is an example of ML that can be used. Supervised or unsupervised ML can also be used as well as variants of evolutionary algorithms.

Figure 1:
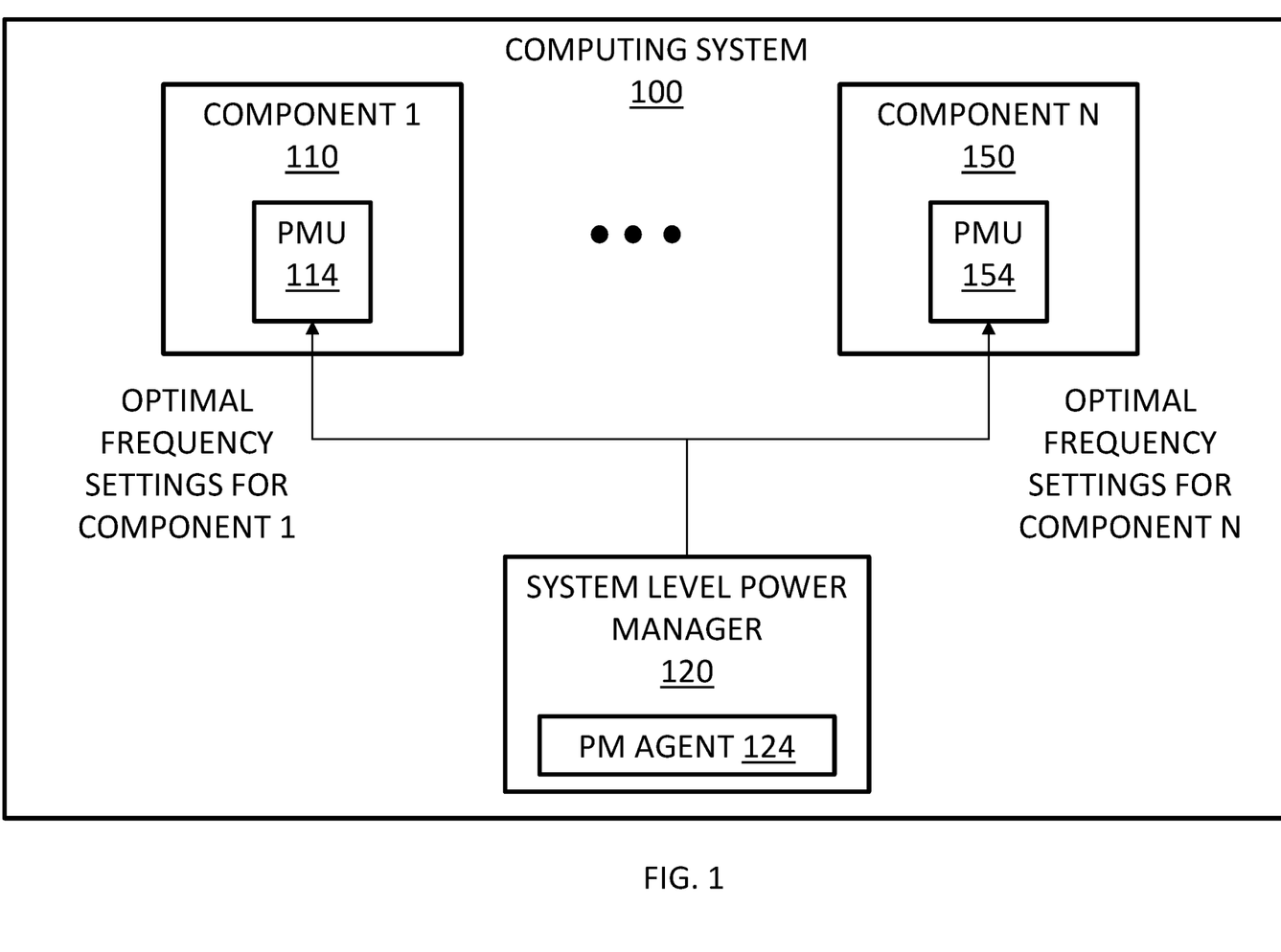
FIG. 1 illustrates a block diagram of an example of a computing system having system level power management (PM)

FIG. 1 illustrates a block diagram of an example of a computing system 100 having system level PM according to the principles of the disclosure. The computing system 100 can operate using a shared operating budget. The computing system 100 can be a ML system, such as a DL system. The computing system 100 has multiple components 1 to N that each have their own power management unit (PMU). The components 1 to N can include a combination of processors, memory, communication interfaces, or other functional circuitry having a dedicated PMU. For example, the components 1 to N can include one or more GPUs, one or more CPUs, one or more DPUs, and one or more network interfaces. Components 1 and N are denoted by element numbers 110 and 150, and the PMU for each of the components 110 and 150 is denoted by elements 114 and 154, respectively.

The computing system 100 also includes a system level power manager 120. The system level power manager 120 learns frequency settings for the different components 1 to N and adjusts the frequency settings of the different components based on a repetitive application and one or more limitations corresponding to a shared operating budget for the computing system 100. The system level power manager 120 provides the learned frequencies as optimal frequencies to the different components 1 to N. The system level power manager 120 includes an automated PM agent 124 that directs the learning and adjusting. The automated PM agent 124 is a ML agent that represents a learning algorithm for power management. The system level power manager 120 can be, for example, the system level power manager of FIG. 4B, and the automated PM agent 124 can be automated PM agent 210 of FIG. 2.

Figure 2:
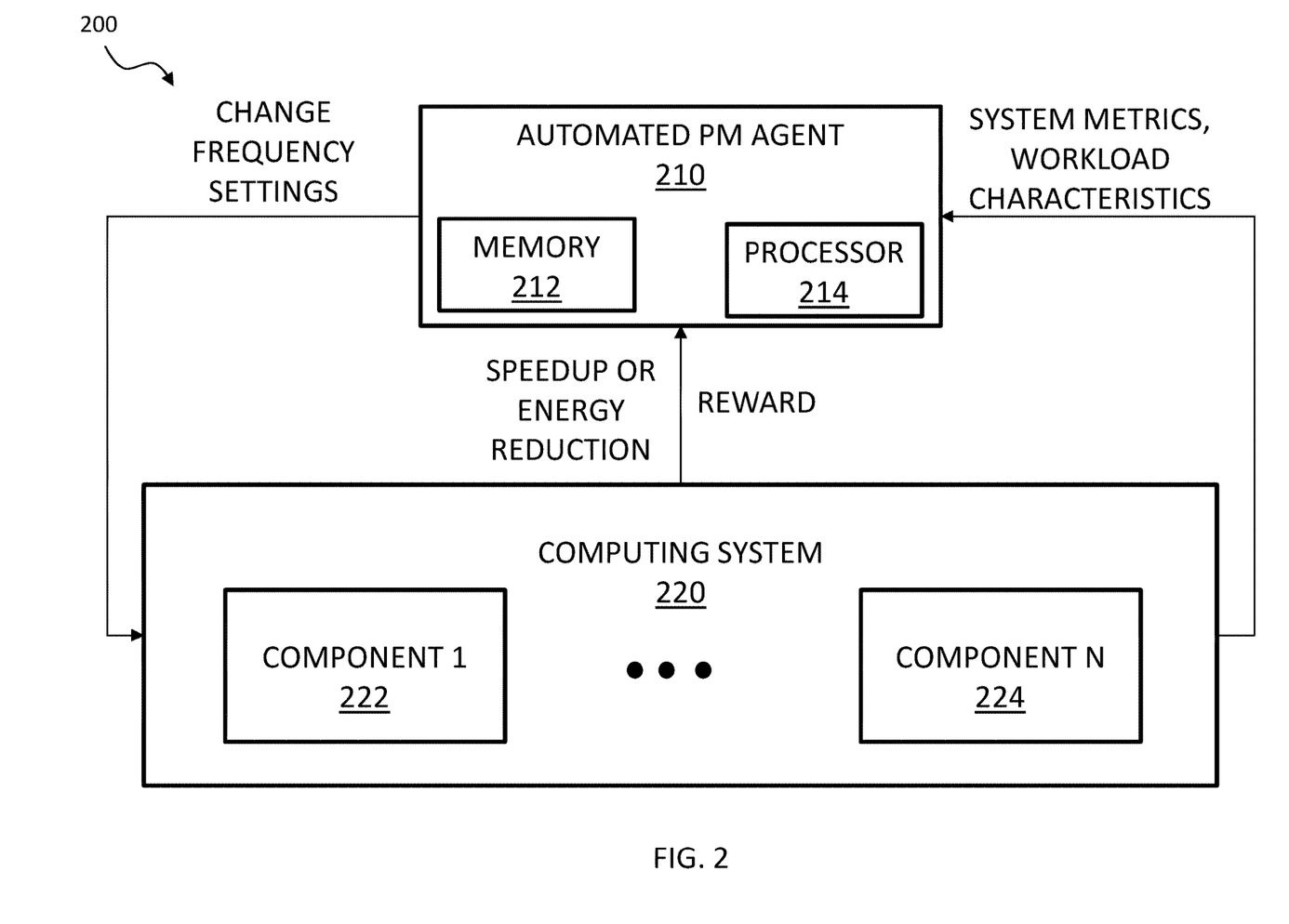
FIG. 2 illustrates a block diagram of an example of a machine learning (ML) system that includes an automated PM agent.
Figure 3:
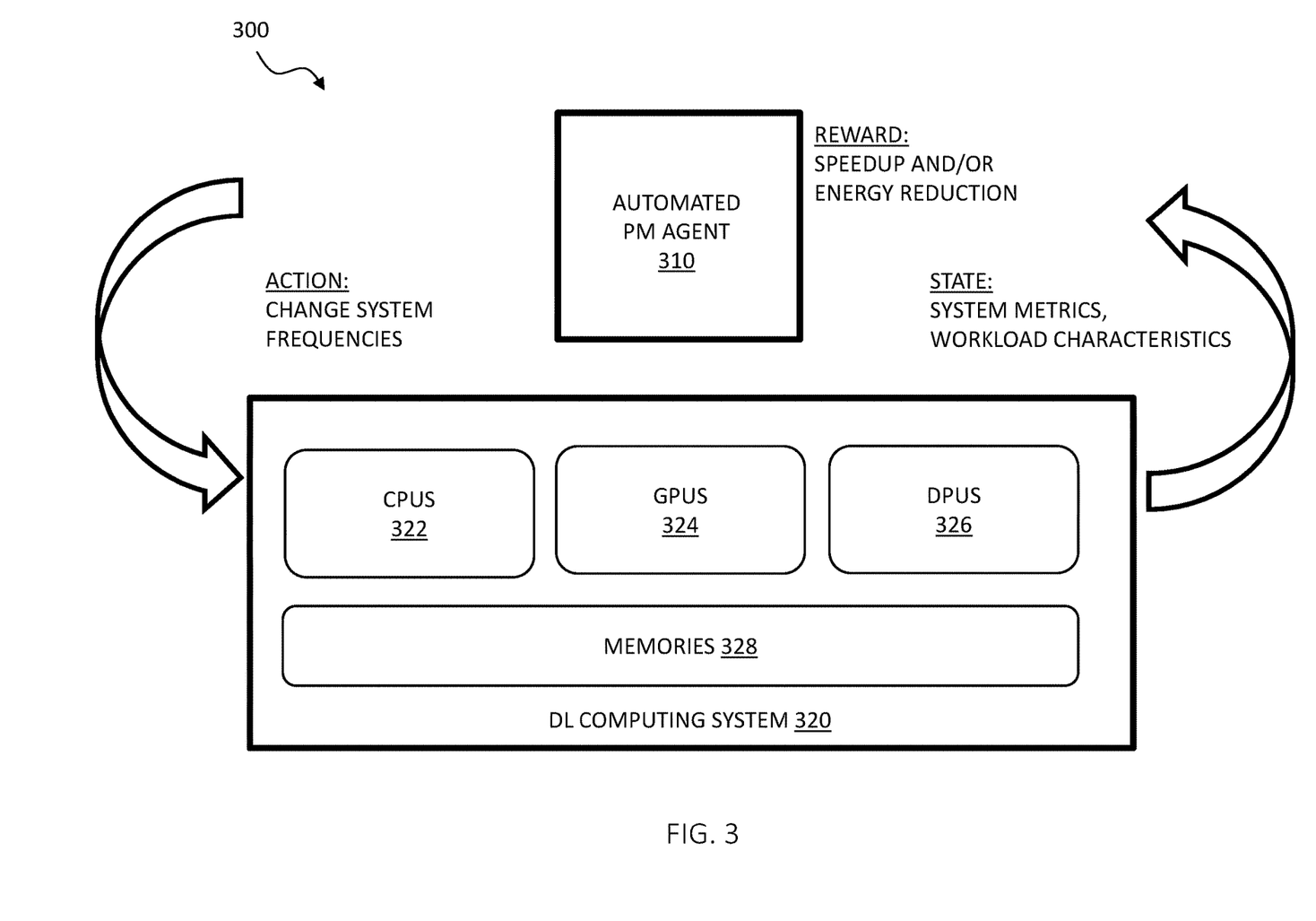
FIG. 3 illustrates a block diagram of an example of a deep learning (DL) system that includes an automated PM agent.

FIG. 2 illustrates a block diagram of an example of a ML system 200 that includes an automated PM agent 210 constructed according to the principles of the disclosure. The automated PM agent 210 includes a memory 212 and a processor 214. The ML system 200 further includes a computing system 220 having multiple components and an operating budget that is shared among the multiple components, which are represented by component-1 222 to component-N 224. The computing system 220 can be a DL computing system such as shown in FIG. 3 or FIG. 4B. The automated PM agent 210 is configured to manage power for the computing system 220.

The memory 212 is configured to receive and store system metrics and workload characteristics from the computing system 220 corresponding to computational phases of a repetitive application executing on the computing system 220. The system metrics include frequencies for component-1 222 to component-N 224 corresponding to the computational phases of the repetitive application. The memory 212 can receive the frequencies during execution of the repetitive application by the computing system 220. The memory 212 can also receive at least some of the frequencies before execution of the repetitive application by the computing system 220. The memory 212 also includes operating instructions corresponding to the power management learning algorithm of the automated PM agent 210 that directs the operation of the processor 214.

The processor 214 is configured to determine adjustments to the frequencies based on one or more limitations corresponding to the shared operating budget for the computing system 220 and rewards. The frequency adjustments for each of the computational phases are provided to component-1 222 to component-N 224 to use for each of the different computational phases. The frequency adjustments can be deployed to the individual PMU of each of the components, component-1 222 to component-N 224. The processor 214 can deploy the adjustments on phase boundaries of the different computational phases. The adjusted frequencies are optimal frequencies directed to execution of the repetitive application on the computing system 220.

The ML system 200 can be used to train the automated PM agent 210 either online or offline using the rewards provided to the automated PM agent 210 from the computing system 220. The automated PM agent 210 can be trained according to method 700. The ML system 200 can be an RL system and the automated PM agent 210 can be an RL agent. The automated PM agent 210 can be trained, for example, according to the RL system of FIG. 4A.

FIG. 3 illustrates a block diagram of an example of a RL system 300 that includes an RL agent, automated PM agent 310, for the RL system 300 and a DL computing system 320. The DL computing system 320 includes one or more GPUs, one or more CPUs, one or more DPUs, and one or more memory, which are represented by CPUs 322, GPUs 324, DPUs 326, and memories 328. The DL computing system 320 can also include additional components, such as one or more network interface. The DL computing system 320 has an operating budget that is shared between the CPUs 322, GPUs 324, DPUs 326, and memories 328.

The automated PM agent 310 is a dynamic power management auto-tuning mechanism that learns and deploys optimal dynamic frequency settings for individual system components, such as for each individual component, of the computing system 320 using a ML/optimization technique such as RL. For example, the automated PM agent 310 can learn and deploy the optimal dynamic frequency setting for the CPUs 322, the GPUs 324, the DPUs 326, and the memories 328.

The automated PM agent 310 can be tuned and deployed for unique individual combinations of a computing platform and learning application, such as a DL application. The automated PM agent 310 receives rewards and state information from the DL computing system 320, such as system metrics and workload characteristics, and can target at least one objective when adjusting the per component frequency settings of the computing system 320. Three example objectives include:

1: Maximize overall performance under a power budget.
2: Minimize energy under a performance constraint.
3: Achieve a targeted tradeoff between energy saving and performance loss.

Examples for achieving a targeted tradeoff include achieving maximal energy savings while staying within X % of optimal performance and/or achieving maximal performance while staying within Y % of minimal energy. The optimization goal could also be defined using other metrics such as energy-delay and/or energy-delay square products (E*D, or E*D^2), etc.

The automated PM agent 310 can be trained to achieve an objective, such as one of the objectives above, by balancing system-level power and thermal budgets, which dynamically shifts the per component share of the overall thermal and power budgets based on its relative impact on overall system performance and/or energy. The automated PM agent 310 can be trained according to method 700.

Because aggregate thermal conditions in computing systems, such as DL computing system 320, build up over relatively long periods of time (seconds or even minutes), the thermal state at any given moment can be ultimately dictated by a sequence of power management choices taken over several relatively short power management phases (each typically controlled at the granularity of milliseconds as noted above) as well as the load and potentially other exogenous factors such as the ambient temperature. The power management problem, therefore, can be framed as a ML problem where the automated PM agent 310 is trained to take a sequence of actions, such as change frequencies, in an environment (i.e., computing system 320) in order to maximize the overall cumulative reward, such as performance increase and/or a power reduction. This differs from previously proposed memory-less supervised learning techniques that focus primarily on current system state to decide the next frequency based on system metrics.

Training of the automated PM agent 310 can be online, offline, or even a combination of both online and offline. "Offline learning" or training of the automated PM agent 310 occurs before the automated PM agent 310 is used in a system, such as for inferencing. With offline training the best possible PM policy, per application, is unlikely to change once a high-quality solution is found. A key example of this use is training automated PM agent 310 for DL inference, where a computing platform must be fine-tuned for an important inference network. The learned policy is then embedded into the inference network implementation to optimize its performance on the systems where it will be executed on in the future. Such an offline optimization can be embedded within a software/compiler optimization flow, such as TensorRT from NVIDIA Corporation of Santa Clara, California, to facilitate high-performance and low-energy inference on parallel processors such as GPUs from NVIDIA.

"Online learning" or training is a second training variant of the automated PM agent 310 that occurs as a task is executing on the computing system 320. In online training, the automated PM agent 310 chooses to dynamically optimize computing system 320 as the task executing thereon is evolving. For example, DL training is a very repeatable task, with millions of iterations performing the same sequence of computing layers as network weights are refined during the training process. In this case, the automated PM agent 310 is actively learning the best PM settings online while training is being executed. Online learning can be further subcategorized into the different categories, such as, single learner multiple followers, multiple learners, multiple followers, and self-learner. For single learner multiple followers, one learner is learning and constantly refining the settings for the follower instances. In multi-processor training runs, such as GPU training runs, single learner multiple followers would allow the automated PM agent 310 to reduce its performance overhead of running on all machines in the training system, such as multiple of the one or more GPUs 324, and instead only execute on a single system (e.g., one of the GPUs 324) with the learned policies being distributed out to other processors in the system (e.g., other ones of the GPUs 324).

For multiple learners, multiple followers, multiple automated PM agents could be learning concurrently with different initial points (i.e., initial state) in the search space to speed up the discovery of near-optimal solutions. The best solutions can periodically be broadcast out to one or more of the follower processors for improved execution time. Multi-GPU training situations is an example wherein solutions can be broadcast based on one of the GPUs 324 to one or more of the other follower GPUs 324.

With self-learner, the learning is performed using the first M iterations and the learned function is deployed for the remaining N iterations (of a total M+N DL iterations) to reduce the performance impact of learning and running the automated PM agent 310 itself.

The various implementations of automated PM agent 310 can combine an offline and online part. For example, using the offline part as a warm start for the online part. Another example is choosing online among several pretrained models.

Figure 4A:
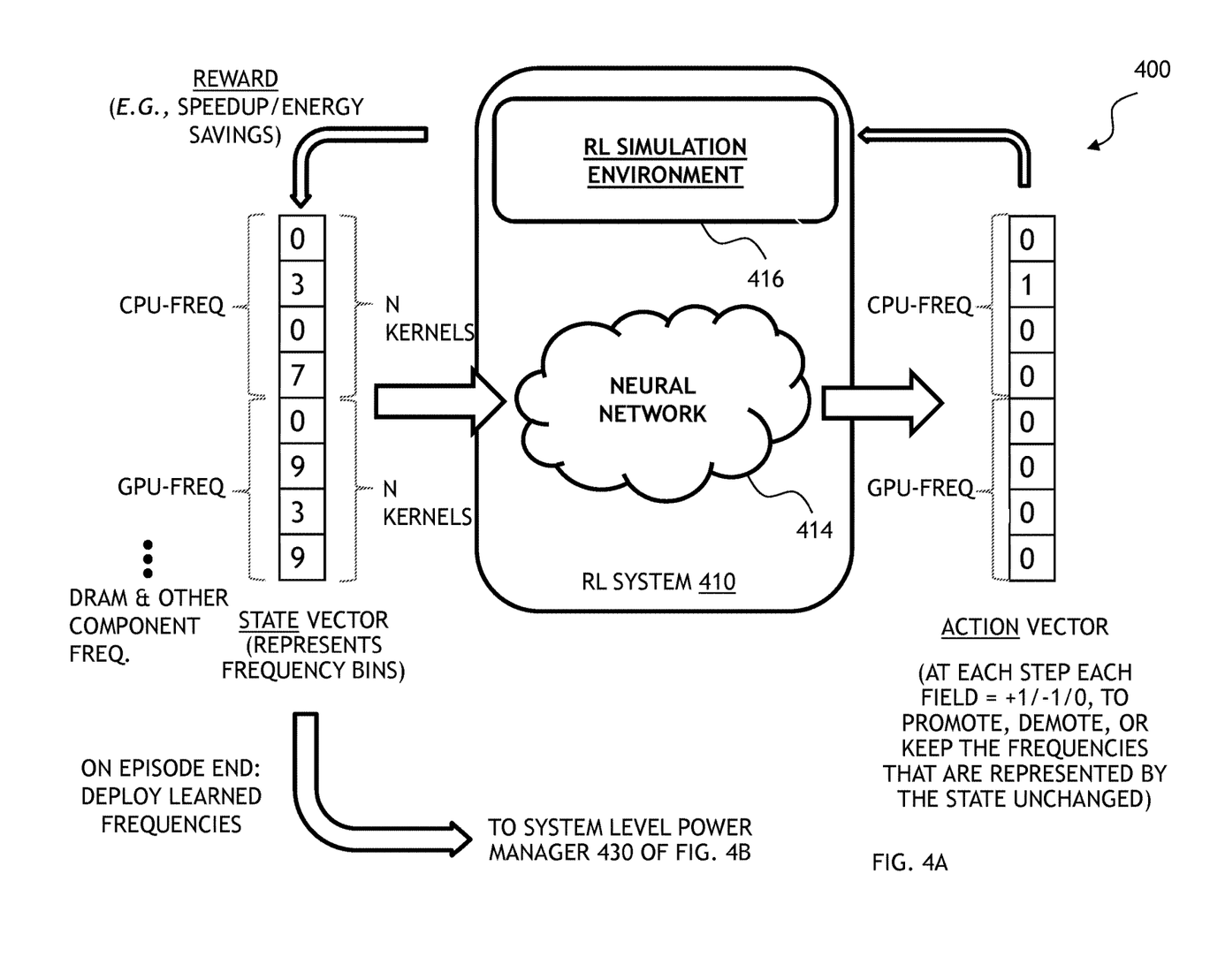
FIGS. 4A and 4B illustrate a diagram of an example of a reinforcement learning (RL) implementation that demonstrates training an automated PM agent and employing the automated PM agent in a system level power manager for a computing system.
Figure 4B:
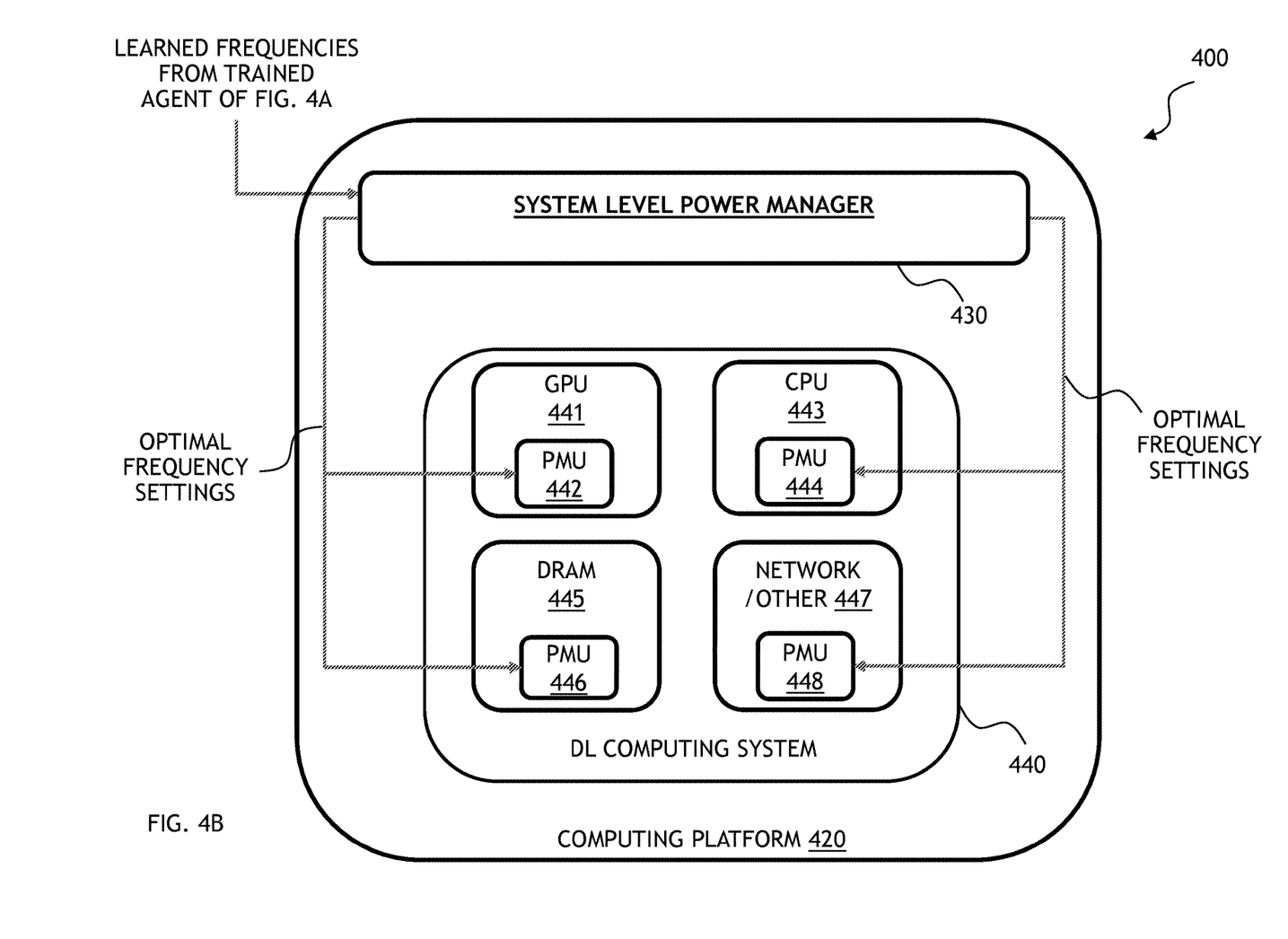

FIGS. 4A and 4B illustrate a diagram of an example of a RL implementation 400 that demonstrates training an automated PM agent 414 and employing the trained automated PM agent 414 in a system level power manager 430 for a computing system. The automated PM agent 414 can be trained according to method 700. FIGS. 4A and 4B provide an automated PM RL framework as an example, wherein FIG. 4A represents an RL system 410 and FIG. 4B represents a computing platform 420 of the RL implementation 400. Other ML implementations are also possible. In addition to the automated PM agent 414, the RL system 410 of FIG. 4A includes a simulation environment 416. The simulation environment 416 can be a DL computing workload (single or multiple iterations) that is directly executed on a DL computing platform of interest. The automated PM agent 414 is represented by a neural network in FIG. 4A.

The RL state is a combination of per component (e.g., CPU, GPU, DRAM, DPU) frequencies per computational phase. A state vector is illustrated that represents frequency bins for a CPU and GPU. The state vector can also include frequencies for other components, such as DRAM. The action at the end of each RL step "increases", "decreases" or "keeps" a single component's frequency bin for a single phase. A 2N+1 dimension action vector can be used, wherein N is a number of compute and memory kernels used for training. An action vector showing the action for each corresponding state vector bin is illustrated. A "1" in the action vector indicates an increase in the corresponding frequency, a "−1" indicates a decrease in the corresponding frequency and a "0" indicates no change to the corresponding frequency. i. The reward provided to the automated PM agent 414 from the simulation environment 416 is a speedup, energy savings, or a combination thereof. Once the RL training is finished (e.g., when the action vector is relatively stable and not changing) for the automated PM agent 414, a learned state vector of per-component frequencies for each computational phase is produced. The learned frequencies can be provided to the system level power manager 430 of the computing platform 420 and deployed at the phase boundaries to the components of the DL computing system 440. The DL computing system 440 includes GPU 441, CPU 443, DRAM 445, and other components denoted as Network and other components 447. Each of the components include their own distinct PMU: PMU 442, PMU 444, PMU 446, and PMU 448. As such, the system level power manager 430 can manage the power for the DL computing system 440 by providing optimal frequency settings from the automated PM agent 414 to the PMUs 442, 444, 446, and 448 for the various components of the DL computing system 440. With invocation of each computational phase (e.g., meaningful piece of code (e.g., kernel/layer)) on the components 441, 443, 445, 447, the system level power manager 430 can deploy the optimal frequency settings to the local PMUs 442, 444, 446, and 448.

The automated PM agent 414 can be trained offline and the system level power manager 430 can use the trained automated PM agent 414 for managing the power of the DL computing system 440. The automated PM agent 414 can also be trained online using the DL computing system 440 as the simulation environment.

Figure 5:
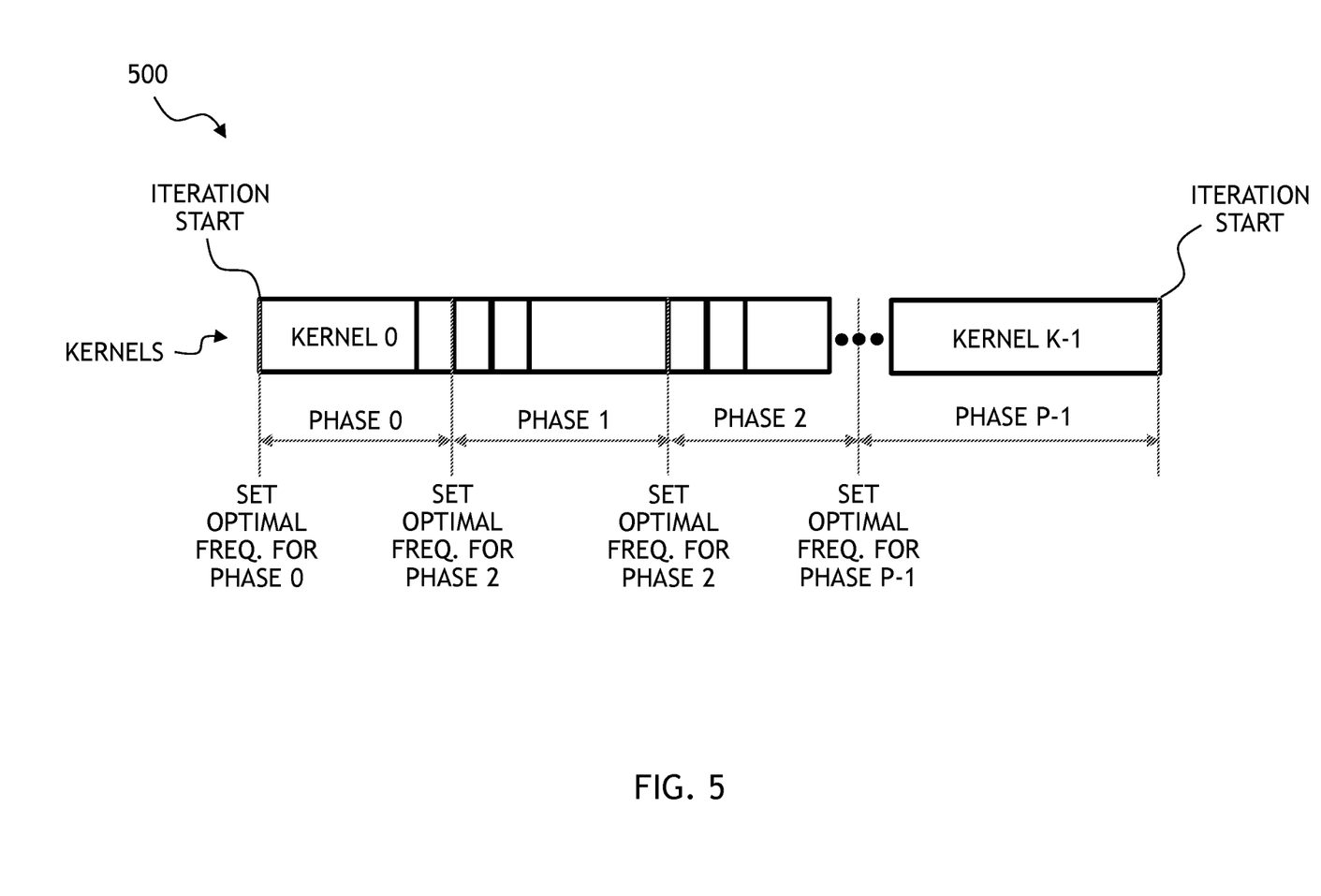
FIG. 5 illustrates a diagram of an example of a single training or inferencing iteration for an automated PM agent.

FIG. 5 illustrates a diagram 500 of an example of a single training or inferencing iteration for an automated PM agent carried out according to the principles of the disclosure. The single iteration can be, for example, either a single iteration within a training sequence, or a single iteration representing a complete inference run. The iteration consists of multiple consecutive compute and memory kernel executions when augmented with an automated PM agent, such as automated PM agent 414 or other agents disclosed herein. The automated PM agent learns optimal frequency settings per computational phase per hardware component and deploys them at run-time through existing low-level PM mechanisms, such as the individual PMU for each of the hardware components. The automated PM agent can be implemented as a layer on top of the baseline PM mechanism. For example, the automated PM agent can be implemented as a software layer on top of individual PMUs, such as PMUs 442, 444, 446, and 448 of FIG. 4B. The automated PM agent can be configured to automatically subdivide various compute and memory kernels into computational phases. The compute and memory kernels can be subdivided, for example, based on their behaviors (such as CPU-bound, GPU-bound, Memory-bound phases) or just based on a periodic time scale. In FIG. 5, a total of K kernels have been subdivided into a total of P phases. Regardless of how divided, each computational phase gets a dedicated power-management state. The automated PM agent automatically learns the optimal frequencies based on the predefined set of reward functions and deploys the pretrained optimal clock frequencies per hardware component at phase boundaries leveraging the existing low-level PM software. This approach can be deployed to maximize the overall performance, and/or energy, or both, while adjusting frequencies on phase boundaries, where computational requirements are likely to change.

FIG. 5 shows an example of a single iteration for training or inferencing. In some scenarios, such as with servers, the amount of data can change for each iteration. The dynamic batch size inference scenario for inference workloads corresponds to a server scenario in ML inferencing that represents a server use-case in which query arrival time is random and latency is important. Almost every consumer-facing website is a good example, including services such as online translation. In such cases, a different number of queries can be batched together for a single inference iteration. Dynamic batch size adds another dimension to the state vector for the automated PM agent (or can serve as an input to the automated PM agent) that will keep track of multiple previous inference batch sizes and PM states (a history that can be used to learn the thermal buildup history) and learn the optimal power management scheme for the new upcoming batch size. In this scenario, each phase as shown in FIG. 5 refers to an inference iteration, which is executing a possibly different batch size at each new iteration.

Figure 6:
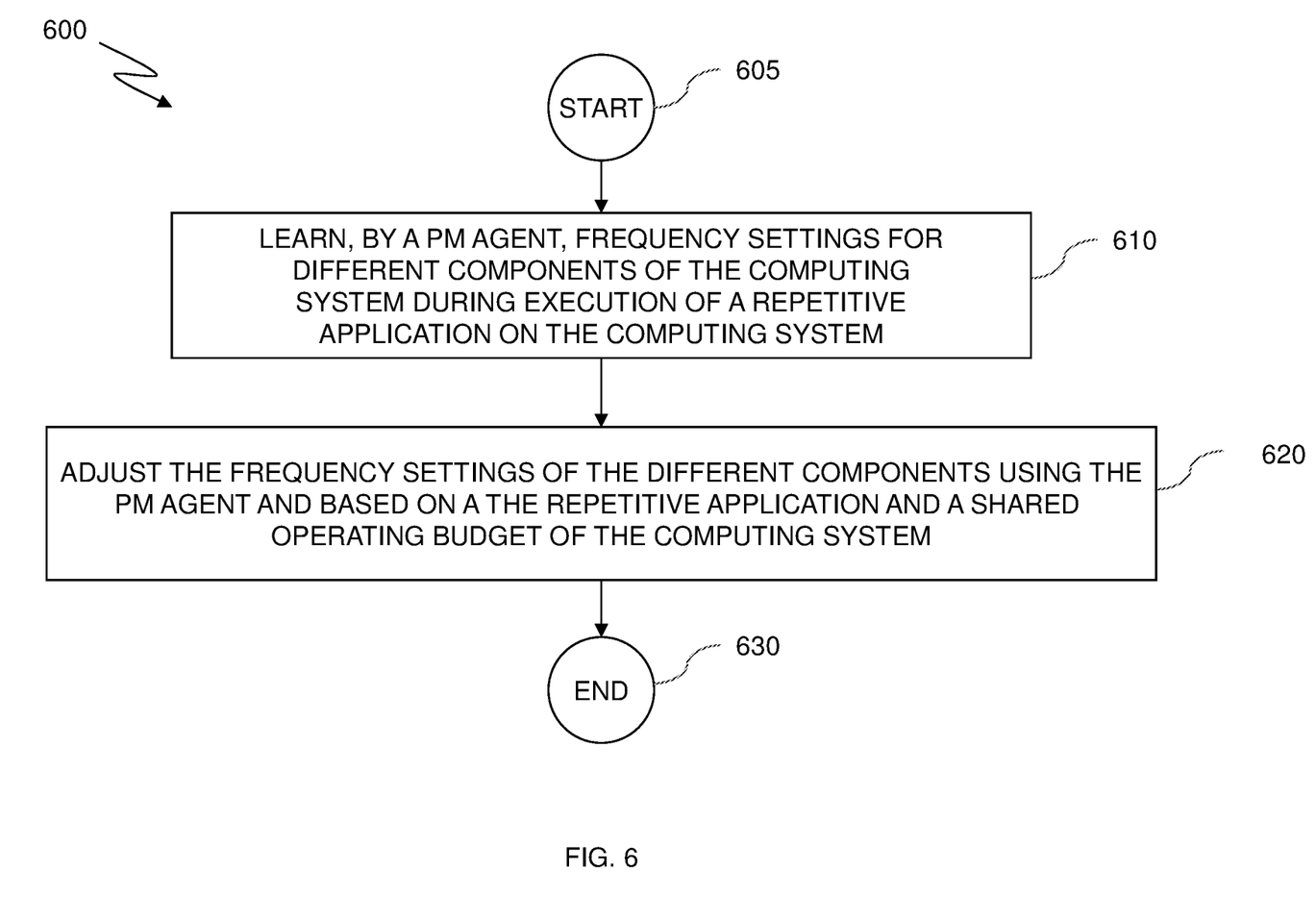
FIG. 6 illustrates a flow diagram of an example of an automated method of power management for a computing system.

FIG. 6 illustrates a flow diagram of an example of an automated method 600 of power management for a computing system carried out according to the principles of the disclosure. The method 600, or at least a portion thereof, can be performed by a system level power manager as disclosed herein, such as system level power managers 120 and 430. The method 600 provides an example of a single occurrence of power management for the computing system and can be repeated multiple times, even continuously, during the operation of the computing system. The computing system can be, for example, a computing system disclosed herein, such as computing systems 320 and 440. The method 600 begins in step 605.

In step 610, frequency settings are learned for different components of the computing system during execution of a repetitive application. A PM agent is used for learning of the frequency settings. The PM agent is a trained ML agent, such as a trained neural network. The PM agent can be an RL agent.

The PM agent can be trained before execution of the repetitive application on the computing system (trained offline), during execution of the repetitive application on the computing system (trained online), or a combination of both.

The learning can include the PM agent receiving frequency settings of the different components per computational phase of the computing system executing the repetitive application. The frequency settings can be received in a batch and a size of the batch can be dynamic during execution of the repetitive application. The repetitive application can be a DL application for training or inferencing.

The frequency settings of the different components are adjusted in step 620 using the PM agent. The adjusting is based on the repetitive application and one or more limitations corresponding to a shared operating budget for the computing system.

The PM agent can initiate the adjustments by providing instructions to increase, decrease, or maintain each of the per component frequencies during execution of the repetitive application. The instructions can be sent for each of the computational phases during execution of the repetitive application. The PM agent can provide the instructions for each particular component to a PMU for that particular component. As such, the PM agent can send instructions to the different PMUs, the instructions can be different for the different PMUs, and the instructions can change for the different PMUs for different computational phases. For example, for a first computational phase the PM agent can instruct a first PMU to increase frequency, a second PMU to decrease, and a third PMU to stay the same. For a subsequent computational phase, the PM agent can instruct the first PMU to maintain the same frequency, the second PMU to decrease, and the third PMU to increase.

The PM agent can be trained for adjusting the frequencies based on different objectives. For example, the PM agent can be trained for the adjusting based on maximizing performance of the computing system executing the repetitive application under the shared power budget of the computing system, based on minimizing energy usage of the computing system under a performance constraint of the computing system executing the repetitive application, or based on a targeted tradeoff between energy savings of the computing system and performance loss of the computing system executing the repetitive application. The PM agent can also be trained based on a combination of different objectives, such as a combination of two or more of the above objectives. The method 600 continues to step 630 and ends.

Figure 7:
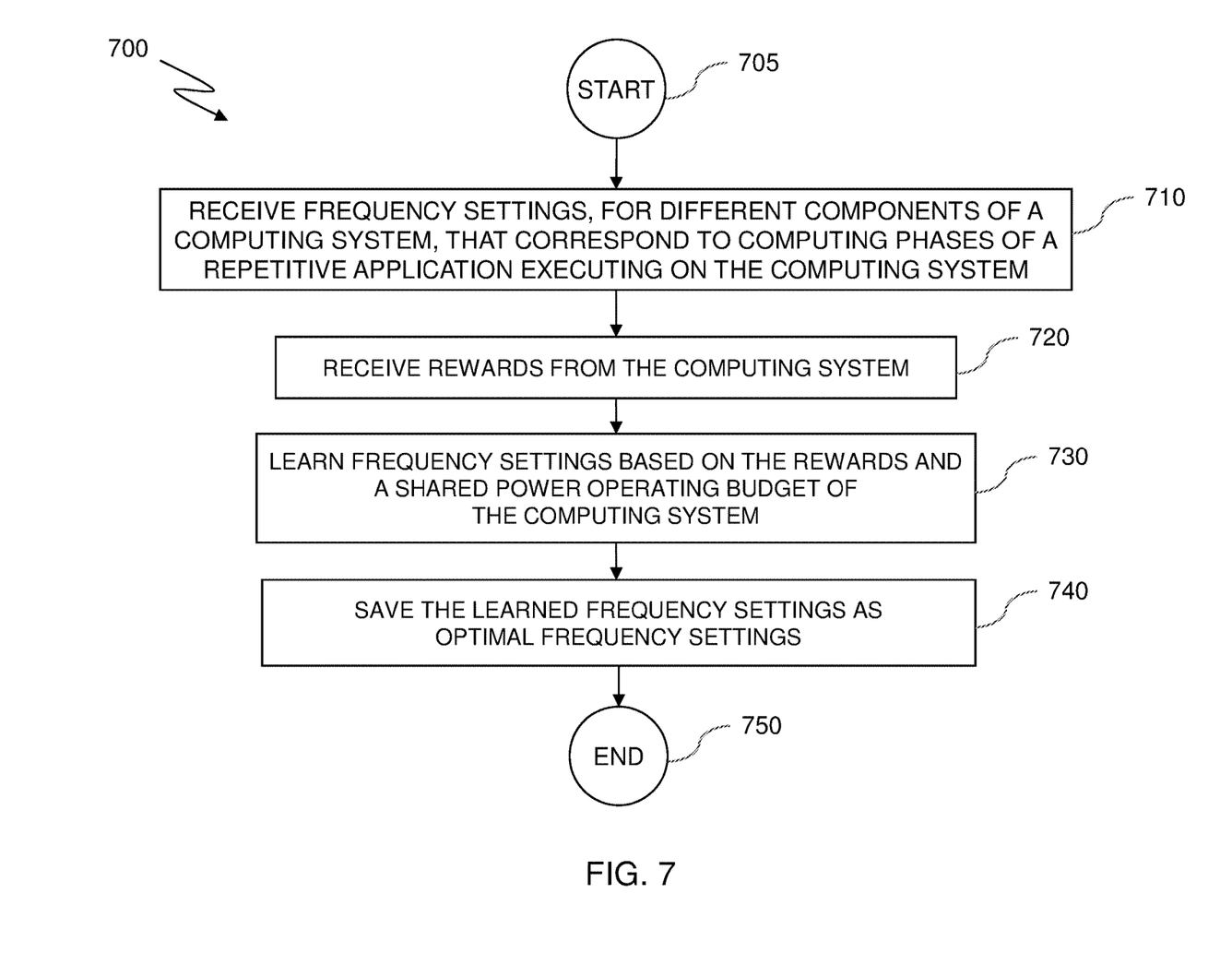
FIG. 7 illustrates a flow diagram of an example of a method of training a PM agent for power management of a computing system.

FIG. 7 illustrates a flow diagram of an example of a method 700 of training a PM agent for power management of a computing system carried out according to the principles of the disclosure. The PM agent is trained to take a sequence of actions, such as change frequencies, in a computing system in order to maximize an overall cumulative reward, such as performance increase and/or a power reduction. The training can be offline or online. The trained PM agent can then be used to automatically manage power for computing systems. The method 700 begins in step 705.

In step 710, frequency settings for different components of a computing system are received that correspond to computational phases of a repetitive application executing on the computing system. The PM agent can be configured to automatically subdivide various compute and memory kernels into the computational phases.

Rewards are received by the PM agent in step 720. The rewards are from the computing system executing the repetitive application. The rewards can be based on performance, energy savings, or a combination of both.

Frequency settings for the computational phases are learned by the PM agent in step 730. The PM agent learns the frequency settings based on one or more limitations corresponding to a shared operating budget of the computing system. The operating budget can include at least one of a shared power budget and a shared thermal budget for the computing system. Learning of the frequency settings is also based on the rewards that are received. Instead of covering all of the computational phases, learning by the PM agent can be performed for a number of computational phases of the computing system and then the learning is applied to additional computational phases of the computing system. The learning can also be performed concurrently by multiple computing systems at different initial spaces.

As noted above, learning the frequency settings by the PM agent can be performed offline, online, or both. For offline training, the computing system can be a simulation environment. For online training, the computing system is the actual computing system that the PM agent is power managing. The repetitive application used for offline training can be different than the repetitive application executing on the computing system for online training.

In step 740, the determined frequency settings are saved as optimal settings for the different components during the computational phases. The PM agent can use the optimal settings for power management of one or more computing systems executing the repetitive application or a similar repetitive application. The optimal settings can be adjusted by the PM agent during execution of the repetitive or similar repetitive application as part of online training. The method 700 continues to step 750 and ends.

Figure 8:
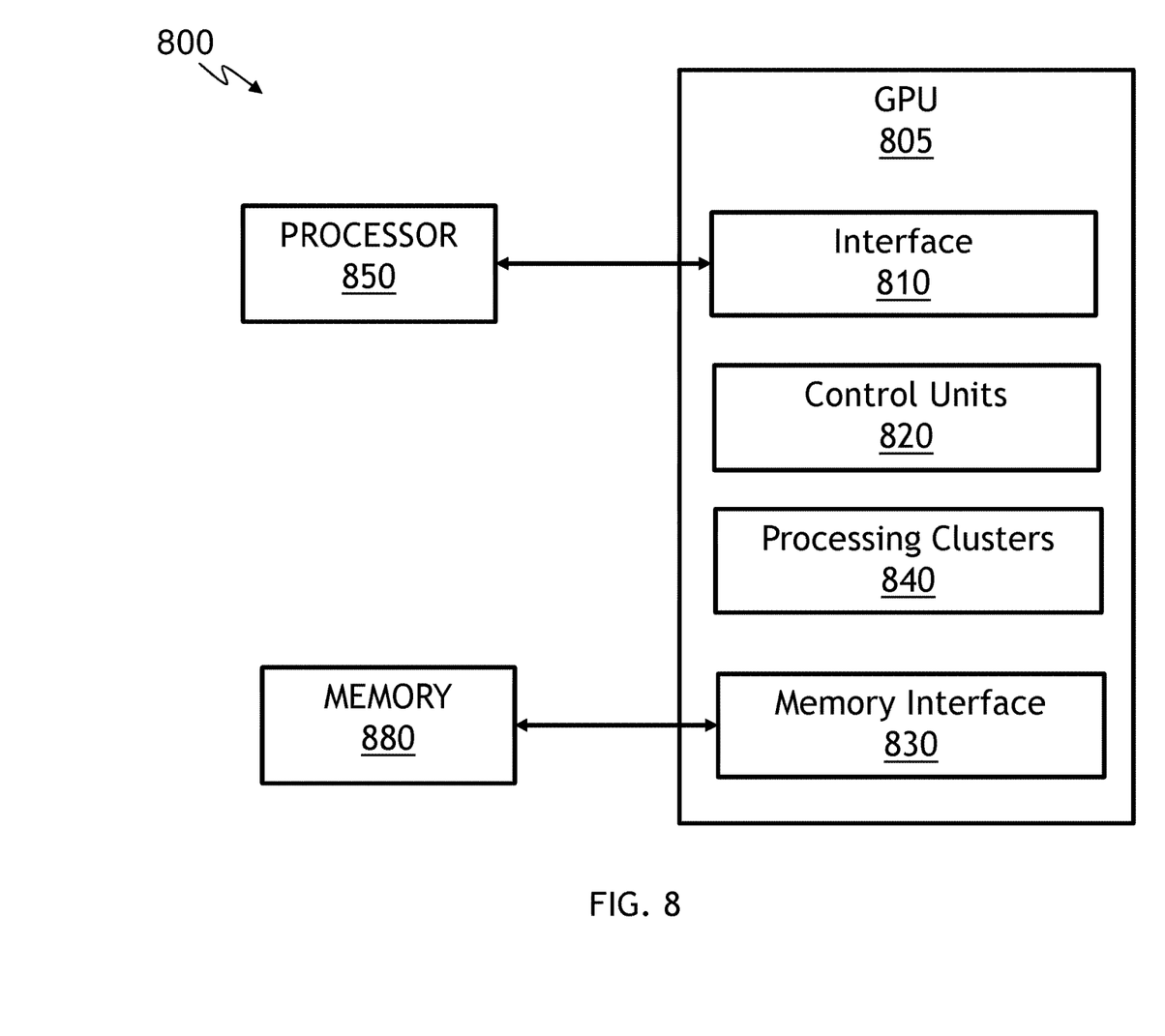
FIG. 8 illustrates a block diagram of an example of a computing system in which at least a portion of the systems, methods, or apparatuses disclosed herein can be implemented.

At least a portion of methods discussed herein can be implemented as a computer program product having a series of operating instructions stored on a non-transitory computer-readable medium that directs a processor when executed thereby to perform operations of the method. The processor can be a CPU or a GPU. Algorithms corresponding to at least a portion of the methods can be stored on a memory and used to direct the operation of a processor. FIG. 8 provides an example of a computing system having a memory and a processor that can be used for at least a portion of the methods or systems disclosed herein.

FIG. 8 illustrates a block diagram of an example of a computing system 800 in which at least a portion of the disclosed systems, methods, or apparatuses disclosed herein can be implemented. Computing system 800 provides an example of a parallel processing unit, GPU 805, included in a system with one or more other devices. Computing system 800 can be embodied on a single semiconductor substrate and can include other devices such as additional GPUs. GPU 805 can be coupled to the additional GPUs via one or more interconnects, such as high-speed interconnects. GPU 805 can be coupled to processor 850, such as or host processor and a memory 880. The processor 850 can be another GPU or a host processor such as a CPU. The memory 880 can include multiple memory devices. GPU 805 includes an interface 810, control units 820, a memory interface 830, and processing cluster 840. GPU 805 can include additional components that are not illustrated but typically included in a GPU, such as communication busses and interconnects. The computing system 800, or at least a portion of the computing system, can be on a cloud computing platform. For example, the GPU 805, the processor 850, the memory 880, or a combination of two or more can be on a server located in a cloud computing environment, such as in a data center. The data center can be a GPU data center. The computing system 800 can be or can be at least a portion of an AI system, such as an autonomous driving system or a vision system. The computing system 800 can also be a gaming system, such as a cloud-based gaming system. One or more of the GPU 805, the processor 850, and the memory 880 can also be distributed on different computing devices and the computing devices can be distal from one another. For example, the processor 850 and memory 880 can be located on one computing device or system and the GPU 805 can be located on another computing device or system.

Interface 810 is an input and output interface configured to communicate data, commands, and other information, with external components, such as the processor 850. Interface 810 can transmit and receive data and commands over conventional interconnects. The interface 810 can be receive input data, such as an application dataset. Received communications can be sent to the various components of GPU 805, such as control units 820. Control units 820 are configured to manage processing streams, configure processing cluster 840 for processing tasks defined by the streams, distribute the tasks to processing cluster 840, and manage the execution of the tasks on processing cluster 840. The results generated by the tasks can be directed to memory interface 830. Memory interface 830 is configured to store the results in a memory, such as memory 880. For example, at least a portion of a trained model can be stored in the memory 880. In addition to writing to memory 880, memory interface 830 is also configured to read data from memory 880. The memory 880 can also store software or code corresponding to algorithms as represented herein. For example, a PM agent, such as a trained PM agent, can be stored on memory 880. The code can direct operations of the processing cluster 840. The memory 880 can be or include a non-transitory computer readable medium.

Processing cluster 840 includes multiple processing cores for processing the tasks. The processing cores can be optimized for matrix math operations and can be employed for training NNs. In some examples, the processing cores can be ReRAM crossbar. Processing cluster 840 can include a pipeline manager that directs the operation of the processing cores for parallel processing of the tasks. Processing cluster 840 can also include additional components for processing the tasks, such as a memory management unit. A trained model as disclosed herein can be used with the processing cores.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

The digital data processors or computers can be comprised of one or more GPUs, one or more CPUs, one or more of other processor types, or a combination thereof. The digital data processors and computers can be located proximate each other, proximate a user, in a cloud environment, a data center, or located in a combination thereof. For example, some components can be located proximate the user and some components can be located in a cloud environment or data center.

The GPUs can be embodied on a single semiconductor substrate, included in a system with one or more other devices such as additional GPUs, a memory, and a CPU. The GPUs may be included on a graphics card that includes one or more memory devices and is configured to interface with a motherboard of a computer. The GPUs may be integrated GPUs (iGPUs) that are co-located with a CPU on a single chip. Configured or configured to means, for example, designed, constructed, or programmed, with the necessary logic and/or features for performing a task or tasks.

The processors or computers can be part of GPU racks located in a data center. The GPU racks can be high-density (HD) GPU racks that include high performance GPU compute nodes and storage nodes. The high performance GPU compute nodes can be servers designed for general-purpose computing on graphics processing units (GPGPU) to accelerate deep learning applications. For example, the GPU compute nodes can be servers of the DGX product line from Nvidia Corporation of Santa Clara, California.

The compute density provided by the HD GPU racks is advantageous for AI computing and GPU data centers directed to AI computing. The HD GPU racks can be used with reactive machines, autonomous machines, self-aware machines, and self-learning machines that all require a massive compute intensive server infrastructure. For example, the GPU data centers employing HD GPU racks can provide the storage and networking needed to support large-scale deep neural network (DNN) training.

The NNs disclosed herein include multiple layers of connected nodes that can be trained with input data to solve complex problems. Once the NNs are trained, the NNs can be deployed and used to identify and classify objects or patterns in an inference process through which a NN extracts useful information from a given input.

During training, data flows through the NNs in a forward propagation phase until a prediction is produced that indicates a label corresponding to the input. When the NNs do not correctly label the input, errors between the correct label and the predicted label are analyzed, and the weights are adjusted for features of the layers during a backward propagation phase that correctly labels the inputs in a training dataset. With thousands of processing cores that are optimized for matrix math operations, GPUs such as noted above are capable of delivering the performance required for training NNs for artificial intelligence and machine learning applications.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Various aspects of the disclosure can be claimed including the systems and methods as noted in the summary. Each of the aspects noted in the summary may have one or more of the elements of the dependent claims presented below in combination.

What is claimed is:

1. An automated method of power management for a computing system using machine learning, comprising:
   learning, using a power management (PM) agent employing the machine learning, frequency settings for different components of a computing system during execution of a repetitive application; and
   adjusting the frequency settings of the different components using the PM agent, wherein the adjusting is based on the repetitive application and one or more limitations corresponding to a shared operating budget for the computing system.

2. The automated method as recited in claim 1, wherein the shared operating budget includes a shared power budget and a shared thermal budget.

3. The automated method as recited in claim 1, wherein the PM agent is trained for the adjusting based on maximizing performance of the computing system executing the repetitive application under a shared power budget of the computing system.

4. The automated method as recited in claim 1, wherein the PM agent is trained for the adjusting based on minimizing energy usage of the computing system under a performance constraint of the computing system executing the repetitive application.

5. The automated method as recited in claim 1, wherein the PM agent is trained for the adjusting based on a targeted tradeoff between energy savings of the computing system and performance loss of the computing system executing the repetitive application.

6. The automated method as recited in claim 1, wherein the PM agent is trained offline, trained online, or a combination of both offline and online training.

7. The automated method as recited in claim 1, wherein the learning includes the PM agent receiving per component frequencies per computational phases of the computing system executing the repetitive application.

8. The automated method as recited in claim 7, wherein the adjusting includes the PM agent providing instructions to increase, decrease, or maintain each of the per component frequencies for the computational phases of the computing system executing the repetitive application.

9. The automated method as recited in claim 8, wherein the adjusting includes the PM agent providing the instructions for each component to a power management unit for that component.

10. The automated method as recited in claim 1, wherein a batch size of the frequency settings for the learning and the adjusting is dynamic.

11. The automated method as recited in claim 1, wherein the PM agent is a reinforcement learning (RL) agent.

12. The automated method as recited in claim 1, wherein the repetitive application is a deep learning application for training or inferencing.

13. The automated method as recited in claim 1, wherein the PM agent is a trained neural network.

14. A power-management (PM) agent for a computing system, comprising:
   a memory that receives frequencies for individual components of a computing system corresponding to computational phases of a repetitive application determined by machine learning; and
   one or more processing units that perform operations including determining adjustments to the frequencies based on one or more limitations corresponding to a shared operating budget for the computing system.

15. The PM agent as recited in claim 14, wherein the operations further include deploying the adjustments for the individual components to a power management unit (PMU) of the corresponding one of the individual components.

16. The PM agent as recited in claim 15, wherein the adjustments are deployed on phase boundaries of the computational phases.

17. The PM agent as recited in claim 14, wherein the memory receives the frequencies during execution of the repetitive application by the computing system.

18. The PM agent as recited in claim 14, wherein the memory receives at least some of the frequencies before execution of the repetitive application by the computing system.

19. The PM agent as recited in claim 14, wherein the adjusted frequencies are optimal frequencies directed to the repetitive application and the computing system.

20. The PM agent as recited in claim 14, wherein the PM agent is a reinforcement learning (RL) agent.

21. A method of training a power management (PM) agent for a computing system using machine learning, comprising:
   receiving frequency settings for different components of a computing system that correspond to computational phases of a repetitive application executing on the computing system;
   learning frequency settings for the computational phases employing the machine learning based on one or more limitations corresponding to thermal shared operating budget for the computing system; and
   saving the frequency settings as optimal settings for the different components during the computational phases.

22. The method of training as recited in claim 21, further comprising receiving rewards based on performance or energy savings of the computing system, wherein the learning is further based on the rewards.

23. The method of training as recited in claim 21, wherein the receiving and learning are performed during execution of the repetitive application on the computing system.

24. The method of training as recited in claim 23, further comprising providing the optimal settings for other computing systems.

25. The method of training as recited in claim 23, wherein the receiving and the learning are performed concurrently by multiple computing systems at different initial spaces and the method further comprises providing the optimal settings for multiple computing systems.

26. The method of training as recited in claim 23, wherein the learning is performed for a number of computing iterations of the computing system and the method further comprises deploying the learning for additional iterations of the computing systems.

27. The method of training as recited in claim 21, wherein the receiving and learning are performed offline before execution of the repetitive application on the computing system.

28. The method of training as recited in claim 27, wherein the repetitive application used for offline training is different than the repetitive application executing on the computing system.

\* \* \* \* \*